United States Patent
Soga (10) Patent No.: US 10,865,297 B2
(45) Date of Patent: Dec. 15, 2020

(54) CURABLE RESIN COMPOSITION, CURED PRODUCT, FUEL CELL, AND SEALING METHOD

(71) Applicant: THREEBOND CO., LTD., Hachioji (JP)

(72) Inventor: Tetsunori Soga, Hachioji (JP)

(73) Assignee: THREEBOND CO., LTD., Hachioji (JP)

( * ) Notice: Subject to any disclaimer, the term of this patent is extended or adjusted under 35 U.S.C. 154(b) by 53 days.

(21) Appl. No.: 16/316,256

(22) PCT Filed: Jul. 14, 2017

(86) PCT No.: PCT/JP2017/025803
§ 371 (c)(1),
(2) Date: Jan. 8, 2019

(87) PCT Pub. No.: WO2018/012631
PCT Pub. Date: Jan. 18, 2018

(65) Prior Publication Data
US 2019/0315957 A1    Oct. 17, 2019

(30) Foreign Application Priority Data
Jul. 14, 2016    (JP) ................................ 2016-139077

(51) Int. Cl.
*C08L 23/22* (2006.01)
*C08L 83/04* (2006.01)
(Continued)

(52) U.S. Cl.
CPC .............. *C08L 23/22* (2013.01); *C08L 83/04* (2013.01); *C08L 91/005* (2013.01); *F16J 15/14* (2013.01);
(Continued)

(58) Field of Classification Search
CPC .. C09J 123/22; H01M 8/0273; H01M 8/0282; H01M 8/1004
See application file for complete search history.

(56) References Cited

U.S. PATENT DOCUMENTS

| 2005/0043480 A1 | 2/2005 | Osawa |
| 2005/0123704 A1* | 6/2005 | Sakai ................... C09D 183/04 428/40.1 |

(Continued)

FOREIGN PATENT DOCUMENTS

| JP | 2001-0214016 A | 8/2001 |
| JP | 2001-240756 A | 9/2001 |

(Continued)

OTHER PUBLICATIONS

Machine Translation of JP2001-325972A (Apr. 15, 2020) (Year: 2020).*

(Continued)

*Primary Examiner* — Matthew J Merkling
(74) *Attorney, Agent, or Firm* — Manabu Kanesaka (57) ABSTRACT

The present invention aims to provide a curable resin composition which has low viscosity as well as properties such as rubber physical property and hydrogen gas barrier property. The present invention provides a curable resin composition including the following ingredients (A) to (D): ingredient (A): a vinyl-based polymer having one or more alkenyl groups in one molecule, ingredient (B): a compound having one or more hydrosilyl groups in one molecule, ingredient (C): a hydrosilylation catalyst, and ingredient (D): a plasticizer having at least two peaks in a molecular weight distribution measured by GPC.

20 Claims, 2 Drawing Sheets

(51) Int. Cl.
 *C08L 91/00* (2006.01)
 *F16J 15/14* (2006.01)
 *H01M 8/0271* (2016.01)
 *H01M 8/10* (2016.01)

(52) U.S. Cl.
 CPC ........... *H01M 8/0271* (2013.01); *H01M 8/10* (2013.01); *C08L 2201/08* (2013.01); *C08L 2201/14* (2013.01); *C08L 2312/06* (2013.01)

(56) References Cited

U.S. PATENT DOCUMENTS

| | | | |
|---|---|---|---|
| 2006/0052546 A1 | 3/2006 | Morikawa et al. | |
| 2008/0251202 A1* | 10/2008 | Eagle | C09J 163/00 |
| | | | 156/330 |
| 2009/0176953 A1 | 7/2009 | Morikawa et al. | |
| 2011/0003090 A1* | 1/2011 | Buzoujma | C09J 171/02 |
| | | | 428/1.5 |
| 2015/0115311 A1* | 4/2015 | Yoshida | C08L 83/00 |
| | | | 257/100 |
| 2017/0369629 A1* | 12/2017 | Mashima | C08G 18/10 |

FOREIGN PATENT DOCUMENTS

| | | |
|---|---|---|
| JP | 2001-0325972 A | 11/2001 |
| JP | 2002-105263 A | 4/2002 |
| JP | 2002-332410 A | 11/2002 |
| JP | 2004-075824 A | 3/2004 |
| JP | 2004-111146 A | 4/2004 |
| JP | 2007-100099 A | 4/2007 |
| JP | 2009-007446 A | 1/2009 |
| JP | 2009-084353 A | 4/2009 |
| JP | 2011-124258 A | 6/2011 |
| JP | 2012-082262 A | 4/2012 |

OTHER PUBLICATIONS

PCT/ISA/210, "International Search Report for International Application No. PCT/JP2017/025803," dated Oct. 10, 2017.

* cited by examiner

CURABLE RESIN COMPOSITION, CURED PRODUCT, FUEL CELL, AND SEALING METHOD

RELATED APPLICATIONS

The present application is National Phase of International Application No. PCT/JP2017/025803 filed Jul. 14, 2017, and claims priority from Japanese Application No. 2016-139077, filed Jul. 14, 2016, the disclosure of which is hereby incorporated by reference herein in its entirety.

TECHNICAL FIELD

The present invention relates to a curable resin composition having low viscosity as well as properties such as a rubber physical property and a hydrogen gas barrier property.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and generates only water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operating temperature is relatively low temperature (around 80° C.), and therefore is expected for usages such as power sources for automobiles, power generators for households, small power sources for electronic equipment such as mobile phones, and power sources for emergency.

Figure 1:
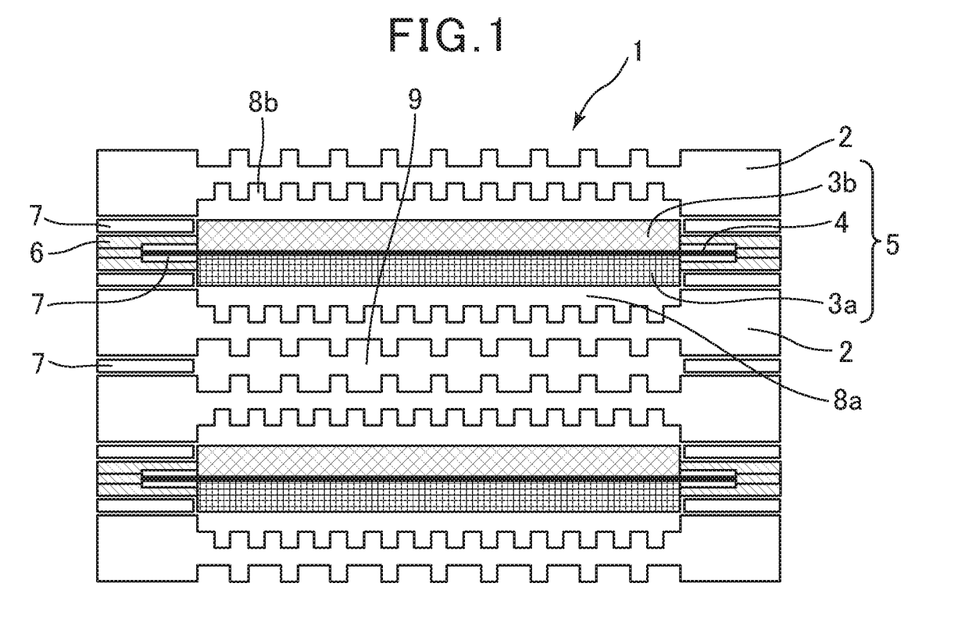
FIG. 1 is a schematic cross sectional view of a single cell of a fuel cell.

As illustrated in FIG. 1, a cell 1 of a solid polymer fuel cell has a structure including: an electrolyte membrane electrode assembly 5 (MEA) structured such that a polymer electrolyte membrane 4 is nipped between a fuel electrode 3a and an air electrode 3b; a frame 6 which supports the MEA; and separators 2 by which gas flow paths are formed.

In order to activate the solid polymer fuel cell, it is necessary to supply a fuel gas containing hydrogen to an anode electrode and supply an oxidation gas (oxygen gas) containing oxygen to a cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxidation gas, and so on. Specifically, the sealing agent is used between adjacent separators, between a separator and a frame, between a frame and an electrolyte membrane or MEA, and so on.

As to sealing agents for use in solid polymer fuel cells, studies have been made on: a thermosetting resin composition which uses a polyisobutylene-based polymer and causes a hydrosilylation reaction (see Patent Literature 1); a thermosetting resin composition which uses a fluoropolyether compound and causes a hydrosilylation reaction (see Patent Literature 2); a thermosetting resin composition which uses a fluoropolymer and causes a hydrosilylation reaction (see Patent Literature 3); and a thermosetting resin composition which uses an ethylene-propylene-diene rubber (see Patent Literature 4) as these compositions are rubber elastic bodies being excellent in hydrogen gas barrier properties, low moisture permeability, heat resistance, acid resistance, and flexibility.

CITATION LIST

Patent Literatures

Patent Literature 1: Japanese Patent Application Publication No. 2004-111146
Patent Literature 2: Japanese Patent Application Publication No. 2004-075824
Patent Literature 3: Japanese Patent Application Publication No. 2007-100099
Patent Literature 4: Japanese Patent Application Publication No. 2011-124258

SUMMARY OF INVENTION

The thermosetting resin compositions of Patent Literatures 1 to 4, however, use the polymers each having a large molecular weight in order to improve the sealing property, and therefore have a problem that the viscosity increases and the coating workability deteriorates. Also, it is common to use a method for adding a plasticizer to a curable resin composition to lower the viscosity thereof, but this method also causes a problem of lowering of the rubber physical property and the hydrogen gas barrier property.

Under these circumstances, an object of the present invention is to provide a curable resin composition which has low viscosity as well as properties such as high rubber physical property and hydrogen gas barrier property.

Means for Solution of the Problems

The above problems can be solved by the curable resin composition of the present invention.

The present invention is a curable resin composition comprising the following ingredients (A) to (D):
ingredient (A): a vinyl-based polymer having one or more alkenyl groups in one molecule
ingredient (B): a compound having one or more hydrosilyl groups in one molecule
ingredient (C): a hydrosilylation catalyst
ingredient (D): a plasticizer having at least two peaks in a molecular weight distribution measured by GPC In other embodiments, the present invention is a fuel cell which uses the curable resin composition in any of a seal between adjacent separators in the fuel cell and a seal between a frame and an electrolyte membrane or MEA in the fuel cell.

In other embodiments, the present invention is a sealing method involving: applying the curable resin composition to a flange of a seal target component; and curing the curable resin composition for sealing, with the flange stuck on another flange, by heating or irradiation with active energy rays.

In other embodiments, the present invention is a sealing method involving: applying the curable resin composition to a flange of a seal target component; forming a gasket by curing the curable resin composition by heating or irradiation with active energy rays; and performing compression sealing with the flange stuck on another flange.

In other embodiments, the present invention is a sealing method involving: placing a mold in pressure contact with a flange of a seal target component in advance; forming a gasket by injecting the curable resin composition into a cavity formed between the mold and the flange, and curing the curable resin composition by heating or irradiation with active energy rays; and performing sealing with the flange stuck on the other flange.

The present invention aims to provide a curable resin composition which has low viscosity as well as properties such as rubber physical property and hydrogen gas barrier property.

Furthermore, the present invention can be in the following mode.

[1]

A curable resin composition comprising the following ingredients (A) to (D): ingredient (A): a vinyl-based polymer having one or more alkenyl groups in one molecule
ingredient (B): a compound having one or more hydrosilyl groups in one molecule
ingredient (C): a hydrosilylation catalyst
ingredient (D): a plasticizer having at least two peak top molecular weights in a molecular weight distribution measured by GPC.

[2]

The curable resin composition according to [1] described above, wherein the ingredient (D) is a poly-α-olefin-based plasticizer.

[3]

The curable resin composition according to [1] or [2] described above, wherein the ingredient (D) has a number average molecular weight of 300 to 5000.

[4]

The curable resin composition according to any one of [1] to [3] described above, wherein the vinyl-based polymer of the ingredient (A) is polyisobutylene having one or more alkenyl groups.

[5]

A sealing agent for a fuel cell comprising the curable resin composition according to any one of [1] to [4] described above.

[6]

The sealing agent for a fuel cell according to [5] described above, wherein the sealing agent for the fuel cell is a sealing agent for a periphery of any member selected from the group consisting of separators, frames, electrolytes, fuel electrodes, air electrodes, and electrolyte membrane electrode assemblies, which are members in a fuel cell.

[7]

The sealing agent for a fuel cell according to [5] or [6] described above, wherein the sealing agent for the fuel cell is a sealing agent between adjacent separators in the fuel cell or a sealing agent between a frame and an electrolyte membrane or an electrolyte membrane electrode assembly in the fuel cell.

[8]

The sealing agent for a fuel cell according to any one of [5] to [7] described above, wherein the fuel cell is a solid polymer fuel cell.

[9]

A cured product which is cured by heating or irradiating the curable resin composition according to any one of [1] to [4] described above with an active energy ray.

[10]

A fuel cell comprising any seal selected from the group consisting of seals between adjacent separators in the fuel cell and seals between a frame and an electrolyte membrane or an electrolyte membrane electrode assembly in the fuel cell, wherein the any seal contains the cured product according to [9] described above.

[11]

The fuel cell according to [10] described above, wherein the fuel cell is a solid polymer fuel cell.

[12]

A method for sealing at least part of at least two flanges of seal target components including the at least two flanges, at least one of which is a light-transmissive flange allowing active energy rays to pass therethrough, the method comprising the steps of: applying the curable resin composition according to any one of [1] to [4] described above to a surface of at least one of the flanges; sticking the one flange with the curable resin composition applied thereto onto the other flange with the curable resin composition interposed in between; and sealing the at least part of the at least two flanges by curing the curable resin composition by irradiation with active energy rays through the light-transmissive flange.

[13]

A method for sealing at least part of at least two flanges of seal target components including the at least two flanges, comprising the steps of: applying the curable resin composition according to any one of [1] to [4] described above to at least one of the flanges; irradiating the applied curable resin composition with active energy rays to cure the curable resin composition, thereby forming a gasket composed of a cured product of the curable resin composition; placing the other flange on the gasket, and sealing the at least part of the at least two flanges in such a way that the other flange and the one flange with the curable resin composition applied thereto are pressure bonded together with the gasket interposed in between.

[14]

A method for sealing at least part of at least two flanges of seal target components including the at least two flanges, comprising the steps of: placing a gasket formation mold on at least one of the flanges; injecting the curable resin composition according to any one of [1] to [4] described above into at least part of a cavity formed between the gasket formation mold and the flange on which the mold is placed; irradiating the curable resin composition with the active energy rays to cure the curable resin composition, thereby forming a gasket composed of a cured product of the curable resin composition; detaching the mold from the one flange; and sealing the at least part of the at least two flanges by placing the other flange on the gasket and then pressure bonding the one and the other flanges together with the gasket interposed in between.

Another mode of the present invention may be as follows.

[1b]

A curable resin composition comprising the following ingredients (A) to (D):
ingredient (A): a vinyl-based polymer having one or more alkenyl groups in one molecule
ingredient (B): a compound having one or more hydrosilyl groups in one molecule
ingredient (C): a hydrosilylation catalyst
ingredient (D): a plasticizer having at least two peak top molecular weights in a molecular weight distribution measured by GPC.

[2b]

The curable resin composition according to [1b] described above, wherein the ingredient (D) is a poly-α-olefin-based plasticizer.

[3b]

The curable resin composition according to [1b] or [2b] described above, wherein the ingredient (D) has a number average molecular weight of 300 to 5000.

[4b]

The curable resin composition according to any one of [1b] to [3b] described above, wherein the vinyl-based polymer of the ingredient (A) is polyisobutylene having one or more alkenyl groups.

[5b]

A sealing agent for a fuel cell using the curable resin composition according to any one of [1b] to [4b] described above.

[6b]

The curable resin composition according to any one of [1b] to [5b] describe above, used for sealing any of the members in a fuel cell from the group consisting of separators, frames, electrolytes, fuel electrodes, air electrodes, and MEAs.

[7b]

The curable resin composition according to any one of [1b] to [5b] describe above, used as a sealing agent between adjacent separators in the fuel cell or used for sealing between a frame and an MEA or an electrolyte membrane in the fuel cell.

[8b]

The curable resin composition according to any one of [5b] to [7b] describe above, wherein the fuel cell is a solid polymer fuel cell.

[9b]

A cured product which is cured by heating or irradiating the curable resin composition according to any one of [1b] to [4b] described above with an active energy ray.

[10b]

A fuel cell, wherein the curable resin composition according to any one of [1b] to [4b] described above is used for sealing either between adjacent separators in the fuel cell or between a frame and an MEA or an electrolyte membrane in the fuel cell.

[11b]

The fuel cell according to [10b] described above, wherein the fuel cell is a solid polymer fuel cell.

[12b]

A sealing method comprising: applying the curable resin composition according to any one of [1b] to [4b] described above to a flange of a sealed part; and curing the curable resin composition by heating or irradiating the curable resin composition on the flange, bonded to the other flange, with an active energy ray.

[13b]

A sealing method comprising: applying the curable resin composition according to any one of [1b] to [4b] described above to a flange of a sealed part; forming a gasket by heating or irradiating the curable resin composition with an active energy ray for curing; and then bonding the flange to the other flange for compression sealing.

[14b]

A sealing method comprising: pressing a metal mold against a flange of a sealed part in advance; injecting the curable resin composition according to any one of [1b] to [4b] described above in a cavity produced between the metal mold and the flange; forming a gasket by heating or irradiation with an active energy ray followed by curing; and then sealing the flange bonded to the other flange.

DESCRIPTION OF EMBODIMENTS

The details of the invention are described below.

<Curable Resin Composition>

The present invention is a curable resin composition comprising the following ingredients (A) to (D):

ingredient (A): a vinyl-based polymer having one or more alkenyl groups in one molecule ingredient (B): a compound having one or more hydrosilyl groups in one molecule ingredient (C): a hydrosilylation catalyst ingredient (D): a plasticizer having at least two peak top molecular weights in a molecular weight distribution measured by GPC It is possible to use the ingredients (A) to (D) and optional ingredients to be described later in the curable resin composition of the present invention by appropriately combining ingredients satisfying any of the conditions described below.

<Ingredient (A)>

The ingredient (A) used in the present invention is not particularly limited as long as it is a vinyl polymer having one or more alkenyl groups in one molecule. The viscosity of the ingredient (A) of the present invention at 25° C. is, though not particularly limited, preferably 5 to 3000 Pa·s, more preferably 50 to 2700 Pa·s, and particularly preferably 100 to 2500 Pa·s from the viewpoint of workability and the like. Note that the measurement of the viscosity was carried out using a cone plate type viscometer. In addition, the case where an alkenyl group is at the end of the main chain of the vinyl polymer is preferable from the viewpoint that it is possible to obtain a rubber elastic body with low hardness as well as high strength and low compression set.

The molecular weight of the ingredient (A) of the present invention is, though not particularly limited, preferably 500 to 500,000, further preferably 1,000 to 100,000, and particularly preferably 3,000 to 50,000 in terms of number average molecular weight from the viewpoint of e.g. fluidity and physical properties after curing. Note that, unless otherwise specified, number average molecular weight was calculated by a standard polystyrene conversion method using size exclusion chromatography (SEC).

Additionally, the vinyl polymer of the ingredient (A) includes, for example, polymers which are produced by mainly polymerizing a monomer selected from the group consisting of polyisobutylene, polyisoprene, polybutadiene, styrene, (meth)acrylic acid, (meth)acrylic esters, (meth)acrylamide, acrylonitrile, vinyl acetate fluorine-containing vinyl-based monomers, and silicon-containing vinyl-based monomers. Among them, polyisobutylene, polyisoprene, and polybutadiene are preferable from the viewpoint of sealing property and polyisobutylene is particularly preferable from the viewpoint of excellence in hydrogen gas barrier property.

The polyisobutylene of the ingredient (A) may have, for example, a —[CH$_2$C(CH$_3$)$_2$]— unit or may be polyisobutylene containing a "constituent unit other than the —[CH$_2$C(CH$_3$)$_2$]— unit." In addition, the polyisobutylene contains preferably 50% by mass or more and more preferably 70% by mass or more of the —[CH$_2$C(CH$_3$)$_2$]— unit. Note that in the present invention, the term "polymer" refers to a compound which has a structure with repeating units of monomers in the main chain of the polymer and which is composed of 100 or more repeating units.

For example, commercially available products of the polyisobutylene of the ingredient (A) include, but are not limited to, EPION 200A, 400A, and 600A (manufactured by Kaneka Corporation), and the like.

<Ingredient (B)>

Hydrosilyl group-containing compounds of the ingredient (B) of the present invention are not particularly limited as long as they are cured by hydrosilylation reaction with the ingredient (A). The hydrosilyl group represents a group having a SiH bond. The ingredient (B) includes, but is not particularly limited to, preferably organohydrogen polysiloxanes, and more specifically silicones containing a hydrosilyl group in a molecule which is a linear, branched, cyclic, or reticular molecule. Additionally, a compound having two or more hydrosilyl groups is preferable.

Commercially available products of the ingredient (B) include, but are not particularly limited to, CR-300 and CR-500 (manufactured by Kaneka Corporation), HMS-013, HMS-151, and HMS-301 (manufactured by Azmax Corporation), and SH 1107 Fluid (manufactured by Dow Corning Toray Co., Ltd.). The amount of the ingredient (B) blended is, though not particularly limited, preferably 0.1 to 50 parts by mass, more preferably 1 to 40 parts by mass, further preferably 5 to 30 parts by mass, and particularly preferably 8 to 20 parts by mass relative to 100 parts by mass of the ingredient (A). Within the range of 0.1 parts by mass to 50 parts by mass, it is possible to obtain a good hydrogen gas barrier property of the curable resin composition.

As regards the amount of the ingredient (B) added, define an equivalent ratio (hydrosilyl groups/alkenyl groups), which is the ratio of the hydrosilyl groups of the ingredient (B) to the alkenyl groups contained in the ingredient (A). The equivalent ratio is preferably 0.5 to 2.0 and particularly preferably 0.8 to 1.5. When the amount is 0.5 equivalents or more, the cross-linking density becomes high, and the hydrogen gas barrier property of the cured product tends to improve. When the amount is 2.0 equivalents or less, there is a tendency that a hydrogen gas is generated due to the dehydrogenation reaction and the cured product foaming problem does not occur.

<Ingredient (C)>

As regards the hydrosilylation catalyst which is the ingredient (C) of the present invention, any catalyst can be used without particular limitation.

In the case of curing the present curable resin composition by heating, preferable ingredients (C) include: solid platinum supported on a support such as chloroplatinic acid, platinum simple substance, alumina, silica, and carbon black; complexes of chloroplatinic acid with alcohol, aldehyde, and ketone; platinum-olefin complexes such as $Pt(CH_2=CH_2)_2Cl_2$; platinum-vinylsiloxane complexes such as $Pt_n(ViMe_2SiOSiMe_2Vi)_x$, $Pt[(MeViSiO)_4]_y$, and a platinum divinyltetramethyldisiloxane complex; and platinum-phosphite complexes such as $Pt(PPh_3)_4$ and $Pt(PBu_3)_4$. Among these, chloroplatinic acid, the platinum-olefin complexes, and the platinum-vinylsiloxane complexes are preferable from the viewpoint of excellent activity. The Vi in the above description means a vinyl group.

In addition, when curing the present curable resin composition by irradiation with active energy rays such as ultraviolet rays, preferable ingredients (C) include, for example, a platinum complex having a β-diketonate compound as a ligand and a platinum complex having a cyclic diene compound as a ligand.

The platinum complexes having a β-diketonate compound as a ligand include, for example, trimethyl (acetylacetonato) platinum, trimethyl (3,5-heptanedionate) platinum, trimethyl (methyl acetoacetate) platinum, bis(2,4-pentanedionato) platinum, bis(2,4-hexanedionato) platinum, bis (2,4-heptanedionato) platinum, bis(3,5-heptanedionato) platinum, bis(1-phenyl-1,3-butanedionato) platinum, and bis (1,3-diphenyl-1,3-propanedionato) platinum. Among them, bis(2,4-pentanedionato) platinum is particularly preferable from the viewpoint of high activity by ultraviolet rays.

The platinum complexes having a cyclic diene compound as a ligand include, for example, a (1,5-cyclooctadienyl) dimethyl platinum complex, a (1,5-cyclooctadienyl) diphenyl platinum complex, a (1,5-cyclooctadienyl) dipropyl platinum complex, a (2,5-norboradiene) dimethyl platinum complex, a (2,5-norboradiene) diphenyl platinum complex, a (cyclopentadienyl) dimethyl platinum complex, a (methylcyclopentadienyl) diethyl platinum complex, a (trimethylsilylcyclopentadienyl) diphenyl platinum complex, a (methylcycloocta-1,5-dienyl) diethyl platinum complex, a (cyclopentadienyl) trimethyl platinum complex, a (cyclopentadienyl) ethyl dimethyl platinum complex, a (cyclopentadienyl) acetyl dimethyl platinum complex, a (methylcyclopentadienyl) trimethyl platinum complex, a (methylcyclopentadienyl) trihexyl platinum complex, a (trimethylsilylcyclopentadienyl) trimethyl platinum complex, a (dimethylphenylsilylcyclopentadienyl) triphenyl platinum complex, and a (cyclopentadienyl) dimethyl trimethylsilylmethyl platinum complex.

In addition, examples of catalysts other than platinum compounds include $RhCl(PPh_3)_3$, $RhCl_3$, $RuCl_3$, $IrCl_3$, $FeCl_3$, $AlCl_3$, $PdCl_2.2H_2O$, $NiCl_2$, and $TiCl_4$. These catalysts may be used singly or in combination of two or more kinds.

The amount of the ingredient (C) blended is not particularly limited, but is suitably used in a range of $1 \times 10^{-1}$ to $1 \times 10^{-8}$ mol as a compound relative to 1 mol of alkenyl groups in the ingredient (A). It is preferably used in a range of $1 \times 10^{-2}$ to $1 \times 10^{-6}$ mol. In addition, the absolute amount of the ingredient (C) in the curable resin composition is, for example, 10 to 1000 μl, preferably 20 to 500 μl, more preferably 30 to 300 μl, and further preferably 50 to 100 μl. The form of the ingredient (C) may be either a solid or a liquid, but the suitable form to be used is, for example, the form of an alcoholic solution, preferably the form of solution such as methanol, ethanol, and propanol, and more preferably the form of isopropanol solution.

<Ingredient (D)>

When combined with other ingredients of the present invention, the ingredient (D) of the present invention, a plasticizer having at least two peak top molecular weights in a molecular weight distribution measured by GPC (gel permeation chromatography), makes it possible to obtain a significant effect of achieving properties such as a rubber physical property and a hydrogen gas barrier property at the same time while having a low viscosity. In particular, poly-α-olefin-based plasticizers are preferable because of the similarity in structure and polarity to the ingredient (A) of the present invention and excellence in compatibility. The peak top molecular weight is a value which is measured by GPC (gel permeation chromatography) and which is obtained using the position of the peak top of the molecular weight distribution. Additionally, at least two peak top molecular weights are preferably in a range of 300 to 5000, more preferably in a range of 500 to 4000, and further preferably in a range of 700 to 3000.

The number average molecular weight of the entire molecular weight distribution of the ingredient (D) of the present invention is 300 to 5000, more preferably in a range of 500 to 4000, and particularly preferably in a range of 700 to 3000. The above ranges particularly provide the significant effect of achieving properties such as a rubber physical property and a hydrogen gas barrier property at the same time while having a low viscosity. The number average molecular weight of the ingredient (D) of the present invention was measured by GPC and calculated by the standard polystyrene conversion method.

The polydispersity (weight average molecular weight/ number average molecular weight) of the entire molecular weight distribution of the ingredient (D) of the present invention is in a range of 1.02 to 1.10 and particularly preferably 1.025 to 1.075. The above ranges particularly provide the significant effect of achieving properties such as a rubber physical property and a hydrogen gas barrier property at the same time while having a low viscosity. The polydispersity of the ingredient (D) of the present invention was measured by GPC and obtained using the average molecular weight and the weight average molecular weight calculated by the standard polystyrene conversion method.

Figure 3:
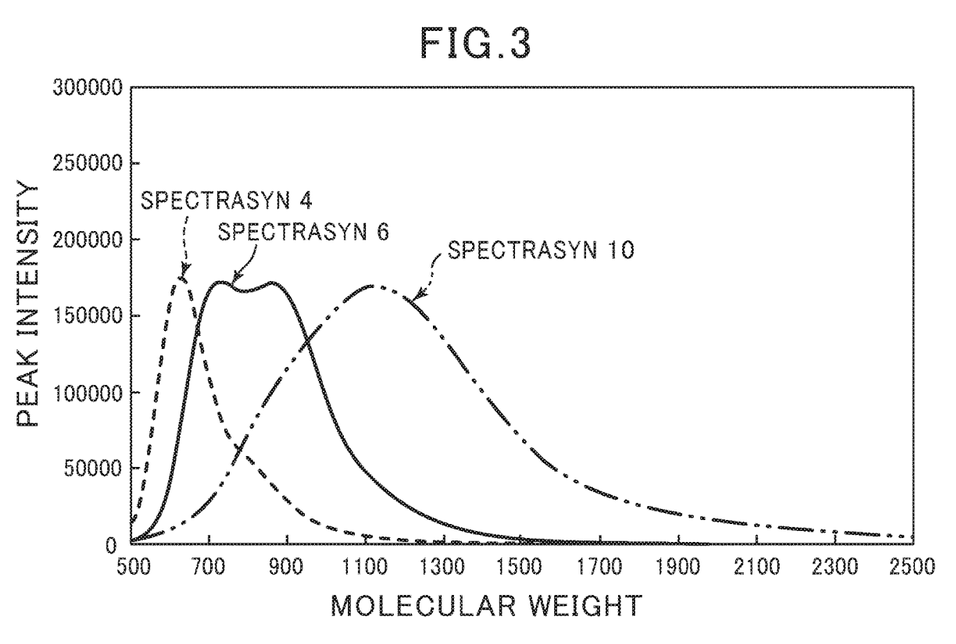
FIG. 3 provides molecular weight distributions measured by GPC of a poly-α-olefin-based plasticizer carried out for SPECTORASYN 10, SPECTORASYN 6, and SPECTORASYN 4.

Suitable examples of the ingredient (D) of the present invention include poly-α-olefins, liquid polybutene, liquid polyisoprene, vegetable oils such as castor oil, and fatty acid esters, preferably poly-α-olefins, liquid polybutene, and liquid polyisoprene, and particularly preferably poly-α-olefins. Commercially available products of the ingredient (D) of the present invention include, but not particularly limited to, SpectraSyn 6 (manufactured by ExxonMobil). Note that the molecular weight distribution measured by GPC of SpectraSyn 6 is as illustrated in FIG. 3. As is understood from FIG. 3, SpectraSyn 6 has peaks at two positions neat the molecular weight of 723 and near the molecular weight of 862.

The ingredient (D) can be obtained by combining two or more kinds of poly-α-olefin-based plasticizers having one peak in the molecular weight distribution measured by GPC. For example, it is possible to obtain the ingredient (D) by combining the poly-α-olefin-based plasticizers SpectraSyn 4 (manufactured by ExxonMobil) and SpectraSyn 10 (manufactured by ExxonMobil) each of which has one peak in the molecular weight distribution measured by GPC. Note that the molecular weight distribution measured by GPC of SpectraSyn 4 and SpectraSyn 10 is as illustrated in FIG. 3. As is understood from FIG. 3, SpectraSyn 4 and SpectraSyn 10 each have one peak near the molecular weight of 627 and near the molecular weight of 1124, respectively.

The amount of the ingredient (D) blended is, though not particularly limited, preferably 1 to 70 parts by mass, more preferably 5 to 60 parts by mass, further preferably 10 to 50 parts by mass, and particularly preferably 20 to 45 parts by mass relative to 100 parts by mass of the ingredient (A). When the amount is 1 part by mass or more, the curable resin composition is lowered in viscosity and workability is improved. When the amount is 70 parts by mass or less, it is possible to obtain a cured product excellent in hydrogen gas barrier property.

<Optional Ingredients>

To the compositions of the present invention, it is possible to use various types of elastomers such as cross-linking agents, reaction rate regulators, and styrene-based copolymers, plasticizers such as fillers, storage stabilizers, antioxidants, light stabilizers, and polyalphaolefins, and additives such as pigments, flame retardants, and surfactants as long as the purpose of the present invention is not impaired.

Cross-linking agents may be added to the present invention. The cross-linking agents include, for example, 2,4,6-tris(allyloxy)-1,3,5-triazine, 1,2-polybutadiene, 1,2-polybutadiene derivatives, trimethylolpropane diallyl ether, pentaerythritol triallyl ether, pentaerythritol tetra(meth)acrylate, trimethylolpropane tri(meth)acrylate, trimethylolpropane di(meth)acrylate, triallyl phosphate ester, triallyl isocyanurate, diallyl isocyanurate, diallyl monoglycidyl isocyanurate, diallyl monobenzyl isocyanurate, diallyl monopropyl isocyanurate, diallyl phthalate, triallyl trimellitate, diethylene glycol bisallyl carbonate, trimethylolpropane diallyl ether, trimethylolpropane triallyl ether, pentaerythritol triallyl ether, pentaerythritol tetraallyl ether, 1,1, 2,2-tetraallyloxyethane, diallylidene pentaerythrit, triallyl cyanurate, 1,2,4-trivinylcyclohexane, 1,4-butanediol diallyl ether, nonanediol diallyl ether, 1,4-cyclohexanedimethanol diallyl ether, triethylene glycol diallyl ether, trimethylolpropane trivinyl ether, pentaerythritol tetravinyl ether, diallyl ether of bisphenol S, divinylbenzene, divinylbiphenyl, 1,3-diisopropenylbenzene, 1,4-diisopropenylbenzene, 1,3-bis (allyloxy) adamantane, 1,3-bis(vinyloxy) adamantane, 1,3, 5-tris(allyloxy) adamantane, 1,3,5-tris(vinyloxy) adamantane, dicyclopentadiene, vinylcyclohexene, 1,5-hexadiene, 1,9-decadiene, diallyl ether, bisphenol A diallyl ether, 2,5-diallylphenol allyl ether, oligomers thereof, and allyl ether of novolac phenol. Among them, 1,2,4-trivinylcyclohexane, triallyl isocyanurate, 2,4,6-tris(allyloxy)-1,3, 5-triazine, 1,2-polybutadiene, and the like are preferable because of excellent miscibility with the ingredient (A) of the present invention.

Reaction rate regulators may be added to the present invention. The reaction rate regulators include, for example, compounds containing an aliphatic unsaturated bond, organic phosphorus compounds, organic sulfur compounds, and nitrogen-containing compounds. These may be used singly or in combination of two or more kinds.

The compounds containing an aliphatic unsaturated bond include, specifically, 3-hydroxy-3-methyl-1-butyne, 3-hydroxy-3-phenyl-1-butyne, 3,5-dimethyl-1-hexyne-3-ol, propargyl alcohols such as 1-ethynyl-1-cyclohexanol, eneyne compounds, maleic anhydride, maleic acid esters such as dimethyl maleate, and the like. Here, the organic phosphorus compounds include, specifically, triorganophosphines, diorganophosphines, organophosphones, triorganophosphites, and the like. Here, the organic sulfur compounds include, specifically, organomercaptans, diorganosulfides, hydrogen sulfide, benzothiazole, thiazole, benzothiazole disulfide, and the like. Here, the nitrogen-containing compounds include, specifically, N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N',N'-tetraethylethylenediamine, N,N-dibutyl-1,4-butanediamine, 2,2'-bipyridine, and the like.

Styrene-based copolymers may be blended in the present invention for the purpose of adjusting the rubber physical property of the cured product. For example, the styrene-based copolymers include, but are not particularly limited to, styrene-butadiene copolymers, styrene-isoprene copolymers (SIP), styrene-butadiene copolymers (SB), styrene-ethylene-butylene-styrene copolymers (SEBS), styrene-isobutylene-styrene copolymers (SIBS), acrylonitrile-styrene copolymers (AS), styrene-butadiene-acrylonitrile copolymers (ABS), and the like.

For the purpose of improving e.g. the elastic modulus and the fluidity of the cured product, fillers may be added to the present invention to an extent that does not impair the storage stability. Although the shape of the filler is not particularly limited, a spherical shape is preferable because it is possible to improve the mechanical strength and suppress the increase in viscosity of the cured product of the curable resin composition. The average particle diameter of the filler is not particularly limited, but is preferably in a range of 0.1 to 1000 μm and further preferably in a range of 0.5 to 300 μm. Examples thereof include organic powders, inorganic powders, metallic powders, and the like. Fillers of inorganic powder include glass, silica, alumina, mica, ceramics, silicone rubber powders, calcium carbonate, aluminum nitride, carbon powders, kaolin clay, dried clay minerals, and dried diatomaceous earth, and the like. The amount of inorganic powder blended is preferably about 0.1 to 100 parts by mass relative to 100 parts by mass of the ingredient (A). When the amount is more than 0.1 parts by mass, the effect will not be reduced. When the amount is 100 parts by mass or less, it is possible to obtain sufficient fluidity of the curable resin composition and to obtain good workability.

Silica can be blended for the purpose of adjusting the viscosity of the curable resin composition or improving the mechanical strength of the cured product. Preferably, it is possible to use ones hydrophobically treated with organochlorosilanes, polyorganosiloxane, hexamethyldisilazane, or the like. Specific examples of the silica (fumed silica) include, for example, commercially available products manufactured by Nippon Aerosil Co., Ltd., such as trade name Aerosil R 974, R 972, R 972 V, R 972 CF, R 805, R 812, R 812 S, R 816, R 8200, RY 200, RX 200, RY 200 S, and R 202.

Fillers of organic powder include, for example, polyethylene, polypropylene, nylon, cross-linked acrylic, cross-linked polystyrene, polyesters, polyvinyl alcohols, polyvinyl butyral, and polycarbonate. The amount of organic powder blended is preferably about 0.1 to 100 parts by mass relative to 100 parts by mass of the ingredient (A). When the amount is more than 0.1 parts by mass, the effect will not be reduced. When the amount is 100 parts by mass or less, it is possible to obtain sufficient fluidity of the curable resin composition and to obtain good workability.

Fillers of metallic powder include, for example, gold, platinum, silver, copper, indium, palladium, nickel, alumina, tin, iron, aluminum, stainless steel, and the like. The amount of metallic powder blended is preferably about 0.1 to 100 parts by mass and more preferably 1 to 50 parts by mass relative to 100 parts by mass of the ingredient (A).

Antioxidants may be added to the present invention. The antioxidant include, for example, quinone-based compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butyl catechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 4,4'-butylidenebis(6-tert-butyl-3-methyl phenol), 4,4'-thiobis(6-tert-butyl-3-methyl phenol), 3,9-bis[2-[3-(3-tert-butyl-4-hydroxy-5-methylphenyl) propionyloxy]-1,1-dimethylethyl]-2,4,8,10-tetraoxaspiro [5,5] undecane, pentaerythritol tetrakis[3-(3,5-di-tert-butyl-4-hydroxyphenyl) propionate], thiodiethylene bis[3-(3,5-di-tert-butyl-4-hydroxyphenyl) propionate], octadecyl-3-(3,5-di-tert-butyl-4-hydroxyphenyl) propionate, N,N'-hexane-1,6-diylbis[3-(3,5-di-tert-butyl-4-hydroxyphenyl) propionamide], benzene propanoic acid, 3,5-bis(1,1-dimethylethyl)-4-hydroxy, $C_7$-$C_9$ side chain alkyl ester, 2,4-dimethyl-6-(1-methylpentadecyl) phenol, diethyl [[3,5-bis(1,1-dimethylethyl)-4-hydroxyphenyl] methyl] phosphonate, 3,3',3'',5,5',5''-hexa-tert-butyl-α,α',α''-(mesitylene-2,4,6-tolyl) tri-p-cresol, calcium diethyl bis[[3,5-bis(1,1-dimethylethyl)-4-hydroxyphenyl] methyl] phosphonate, 4,6-bis(octylthiomethyl)-o-cresol, ethylenebis(oxyethylene) bis[3-(5-tert-butyl-4-hydroxy-m-tolyl) propionate], hexamethylenebis[3-(3,5-di-tert-butyl-4-hydroxyphenyl) propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl) methyl]-1,3,5-triazine-2,4,6 (1H,3H,5H)-trione, a reaction product of N-phenylbenzenamine and 2,4,6-trimethylpentene, 2,6-di-tert-butyl-4-(4,6-bis(octylthio)-1,3,5-triazine-2-ylamino) phenol, picric acid, and citric acid; phosphorus-based compounds such as tris(2,4-di-tert-butylphenyl)phosphite, tris [2-[[2,4,8,10-tetra-tert-butyldibenzo[d,f][1,3,2]dioxaphosphefin-6-yl]oxy]ethyl]amine, bis(2,4-di-tert-butylphenyl) pentaerythritol diphosphite, bis[2,4-bis(1,1-dimethylethyl)-6-methylphenyl]ethyl ester phosphorous acid, tetrakis(2,4-di-tert-butylphenyl)[1,1-bisphenyl]-4,4'-diyl bisphosphonite, 6-[3-(3-tert-butyl-4-hydroxy-5-methylphenyl)propoxy]-2,4,8,10-tetra-tert-butyl dibenz[d,f][1,3,2]dioxaphosphefin; amine-based compounds such as phenothiazine; lactone-based compounds; and vitamin E-based compounds. Among these, phenol-based compounds are preferable.

Light stabilizers may be added to the present invention. The light stabilizers include, for example, hindered amine types such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl-methacrylate, bis(1,2,2,6,6-pentamethyl-4-piperidinyl)[[3,5-bis(1,1-dimethylethyl)-4-hydroxyphenyl]methyl]butyl malonate, decanedioic acid bis(2,2,6,6-tetramethyl-1(octyloxy)-4-piperidinyl)ester, a reaction product of 1,1-dimethylethyl hydroperoxide and octane, N,N',N'',N''''-tetrakis-(4,6-bis-(butyl-(N-methyl-2,2,6,6-tetramethylpiperidine-4-yl) amino)-triazine-2-yl)-4,7-diazadecane-1,10-diamine, a polycondensate of N-(2,2,6,6-tetramethyl-4-piperidyl) butylamine with dibutylamine.1,3,5-triazine.N,N'-bis(2,2,6,6-tetramethyl-4-piperidyl-1,6-hexamethylene diamine, poly [[6-(1,1,3,3-tetramethylbutyl)amino-1,3,5-triazine-2,4-diyl] [(2,2,6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro [5,1,11,2] heneicosan-21-one, β-alanine, N,-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro [5,1,11,2] heneicosan-21-one, 2,2,4,4-tetramethyl-21-oxa-3,20-diazacyclo-[5,1,11,2]-heneicosan-20-propanoic acid dodecyl ester/tetradecyl ester, propanedioic acid, [(4-methoxyphenyl)-methylene]-bis(1,2,2,6,6-pentamethyl-4-piperidinyl)ester, higher fatty acid esters of 2,2,6,6-tetramethyl-4-piperidinol, 1,3-benzenedicarboxamide, N,N'-bis(2,2,6,6-tetramethyl-4-piperidinyl); benzophenone-based compounds such as octabenzone; benzotriazole-based compounds such as 2-(2H-benzotriazole-2-yl)-4-(1,1,3,3-tetramethylbutyl)phenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl)propionate and polyethylene glycol, 2-(2H-benzotriazole-2-yl)-6-dodecyl-4-methyl phenol; benzoate-based compounds such as 2,4-di-tert-butylphenyl-3,5-di-tert-butyl-4-hydroxybenzoate; and triazine-based compounds such as 2-(4,6-diphenyl-1,3,5-triazine-2-yl)-5-[(hexyl)oxy]phenol. Hindered amine-based compounds are particularly preferable.

The curable resin composition of the present invention can be produced by a conventionally known method. It is possible to produce the curable resin composition by, for example, blending predetermined amounts of the ingredient (A) to the ingredient (D), followed by mixing at a temperature of preferably 10 to 70° C. for preferably 0.1 to 5 hours, more preferably mixing at room temperature (25° C.±10° C.) for 0.5 to 2 hours using a mixing means such as a mixer.

<Application Method>

As a method for applying the curable resin composition of the present invention to an adherend, a publicly known method for a sealing agent or an adhesive is used. For example, it is possible to use methods such as dispensing using an automatic coater, spraying, inkjet, screen printing, gravure printing, dipping, and spin coating. The curable resin composition of the present invention is preferably liquid at 25° C. from the viewpoint of easiness in application.

<Curing Method>

Although the method for curing the curable resin composition of the present invention is not particularly limited, curing is possible by heating or irradiating the curable resin composition with active energy rays such as ultraviolet rays and visible light.

When heat-curing the curable resin composition of the present invention, the curing temperature is, though not particularly limited, preferably 30 to 300° C., more preferably 50 to 200° C., and further preferably 60 to 150° C. The curing time is, though not particularly limited, preferably 20 minutes or more and less than 5 hours and further preferably 40 minutes or more and 3 hours or less in the case of 60 to 150° C.

Consider the case of curing by irradiating the curable resin composition of present invention with active energy rays. The light source includes, but is not particularly limited to, low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like. As for an irradiation dose of light irradiation, a total dose is preferably 10 kJ/m$^2$ or more and more preferably 15 kJ/m$^2$ or more from the viewpoint of the properties of a cured product.

<Cured Product>

A cured product of the present invention can be obtained by curing or preferably photocuring the curable resin composition of the present invention in the foregoing curing method by irradiation with active energy rays such as ultraviolet rays. A cured product of the present invention may be any product obtained by curing the curable resin composition of the present invention regardless of a curing method employed.

For example, when the curable resin composition of the present invention is a two-liquid type composition, it is possible to cure at room temperature after mixing. In the case of use as a two-liquid type composition, it is preferable that one liquid contain the ingredient (A) and the other liquid contain the ingredient (B). By separating the ingredient (A) and the ingredient (B) into separate liquids in this way, it is possible to suppress unnecessary reactions during storage and to enhance the storage stability. In use, curing is possible by mixing the two liquids or by bringing them into contact with each other after separate application.

<Usage>

Preferable use of the curable resin composition of the present invention or a cured product thereof is a sealing agent. In the present invention, the sealing agent includes usages such as an adhesive, a coating agent, an injecting agent, a potting agent, and the like. Note that for use in such usages, the curable resin composition of the present invention is preferably liquid at 25° C.

Since the curable resin composition of the present invention is a rubber elastic body being excellent in low gas permeability, low moisture permeability, heat resistance, acid resistance, and flexibility, specific usages of the sealing agents include stacked bodies for fuel cells, solar cells, dye-sensitized solar cells, lithium ion batteries, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; pharmaceutical and medical instruments and equipment; and the like. Among these usages, the usage as fuel cells is particularly preferable because the curable resin composition of the present invention has low viscosity as well as properties such as rubber physical property and hydrogen gas barrier property.

<Fuel Cell>

The fuel cell is a power generator that extracts electric power by chemically reacting hydrogen with oxygen. Here, as for fuel cells, there are four types including a solid polymer fuel cell, a phosphoric acid fuel cell, a molten carbonate fuel cell, and a solid oxide fuel cell. Among them, the solid polymer fuel cell achieves high power generation efficiency while having a relatively low operating temperature (around 80° C.), and therefore is used for applications such as power sources for automobiles, power generators for households, small power source for electronic equipment such as a mobile phone, and power sources for emergency.

Figure 2:
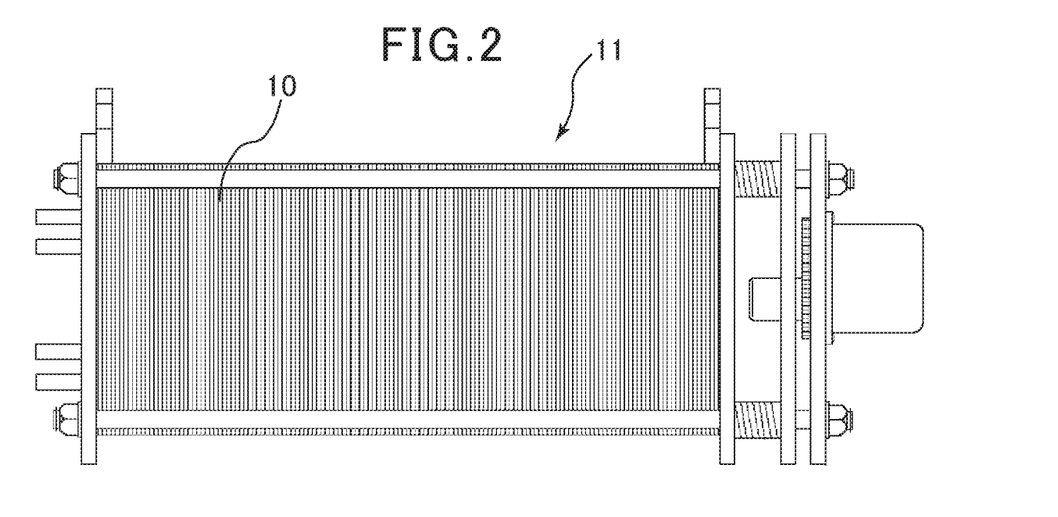
FIG. 2 is a schematic diagram illustrating the entire fuel cell.

As illustrated in FIG. 1, the cell 1 of the typical solid polymer fuel cell has the structure including: the electrolyte membrane electrode assembly 5 (MEA) structured such that the polymer electrolyte membrane 4 is nipped between the fuel electrode 3a and the air electrode 3b; the frame 6 supporting the MEA; and the separators 2 in which the gas flow paths are formed. In order to activate the solid polymer fuel cell, a fuel gas (hydrogen gas) and an oxidation gas (oxygen gas) are supplied through a fuel gas flow path 8a and an oxidation gas flow path 8b. Moreover, for the purpose of suppressing heat generation during power generation, cooling water flows through a cooling water flow path 9. Note that a package including several hundreds of such cells stacked on one another is referred to as a cell stack 10 as illustrated in FIG. 2.

When the fuel gas (hydrogen gas) is supplied to the fuel electrode and the oxidation gas (oxygen gas) is supplied to the air electrode (oxygen electrode), the following reactions occur at the respective electrodes, and a reaction to generate water ($H_2 + \frac{1}{2}O_2 \rightarrow H_2O$) occurs as a whole. To be more specific, protons (H+) generated at the fuel electrode as described below are diffused inside the solid polymer membrane to move to the air electrode side, and water (H₂O) generated by reaction with the oxygen is discharged from the air electrode side.

$H_2 \rightarrow 2H^+ + 2e^-$  Fuel electrode (anode electrode):

$\frac{1}{2}O_2 + 2H^+ + 2e^- \rightarrow H_2O$  Air electrode (cathode electrode):

In order to activate the solid polymer fuel cell, it is necessary to supply the anode electrode with the fuel gas containing hydrogen and supply the cathode electrode with the oxidation gas containing oxygen in such a separated manner that these gases can be isolated from each other. This is because there is a risk of lowering the power generation efficiency, if one of the gases is mixed with the other gas due to insufficiency of the isolation. Against such a background, a sealing agent is used in many portions for the purpose of preventing leakage of the fuel gas, the oxygen gas, and the like. Specifically, the sealing agent is used between adjacent separators, between a separator and a frame, between a frame and an electrolyte membrane or MEA, and so on.

As the polymer electrolyte membrane, there is a cation exchange membrane having ion conductivity, and a preferable one is made of a fluorine-based polymer having a sulfonic acid group or the like, because it is chemically stable and has high resistance under high-temperature operation. There are commercially available products such as Nafion (registered trademark) manufactured by DuPont, Flemion (registered trademark) manufactured by Asahi Kasei Corporation, Aciplex (registered trademark) manufactured by Asahi Glass Co., Ltd., and the like. Although a polymer electrolyte membrane generally has properties difficult to bond, use of the curable resin composition of the present invention makes it possible to bond the polymer electrolyte membrane.

Nafion (registered trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which functions to diffuse the gas or to moisturize the electrolyte. As the gas diffusion layer, a known layer is used, and examples thereof include carbon paper, carbon cloth, carbon fiber, and the like.

As illustrated in FIG. 1, each of the separators 2 is provided with finely-ribbed flow paths, through each of which a fuel gas or an oxidizing gas is supplied to the corresponding electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. As a material for the frame, there are thermoplastic resins such as polyvinyl chloride, polyethylene naphthalate (PEN), polyethylene terephthalate (PET), polypropylene (PP), and polycarbonate. In addition, in order to bond members using the curable resin composition of the present invention or a cured product thereof, it is preferable that the members allow passage of active energy rays.

The fuel cell of the present invention is characterized in that sealing is provided by the curable resin composition of the present invention or a cured product thereof. The members needed to be sealed in the fuel cell are the separators, the frame, the electrolyte, the fuel electrode, the air electrode, the MEA, and so on. More specifically, sealing is provided between the adjacent separators, between the separator and the frame, between the frame and the electrolyte membrane or MEA, and the like. Here, the main purpose of "sealing between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path.

<Sealing Method>

A sealing method using the curable resin composition of the present invention is not particularly limited, and typical methods are FIPG (Form-in-Place Gasket), CIPG (Cure-in-Place Gasket), MIPG (Mold-in-Place Gasket), liquid injection molding, and the like.

FIPG is an adhesive sealing method involving: applying the curable resin composition of the present invention to a flange of a seal target component by an automatic coater or the like; and curing the curable resin composition, with the flange stuck on another flange, by heating or irradiation with active energy rays such as ultraviolet rays from the transmissive flange side. More specifically, this is a method for sealing at least part of at least two flanges of seal target components including the at least two flanges, at least one of which is light-transmissive, allowing active energy rays to pass therethrough, the method characterized by including the steps of: applying the foregoing curable resin composition to a surface of at least one of the flanges; sticking the one flange with the curable resin composition applied thereto onto the other flange with the curable resin composition interposed in between; and sealing the at least part of between the at least two flanges by curing the curable resin composition by irradiation with active energy rays through the transmissive flange.

CIPG is a method involving: applying the curable resin composition of the present invention in the form of a bead to a flange of a seal target component by an automatic coater or the like; forming a gasket by curing the curable resin composition by heating or irradiation with active energy rays such as ultraviolet rays; and performing compression sealing with the flange stuck on another flange. More specifically, this is a method for sealing at least part of at least two flanges of seal target components including the at least two flanges, the method characterized by including the steps of: applying the foregoing curable resin composition to a surface of at least one of the flanges; irradiating the applied curable resin composition with active energy rays to cure the curable resin composition, thereby forming a gasket composed of a cured product of the curable resin composition; placing the other flange on the gasket, and sealing the at least part of between the at least two flanges in such a way that the other flange and the one flange with the curable resin composition applied thereto are pressure bonded together with the gasket interposed in between.

MIPG is a method involving: placing a mold in pressure contact with a flange of a seal target component in advance; forming a gasket by injecting the curable resin composition into a cavity formed between the mold made of an active energy ray-transmissive material and the flange, and by heating or irradiation with the active energy rays such as ultraviolet rays; and performing compression sealing with the flange stuck on the other flange. Here, the mold is preferably made of an active energy ray-transmissive material, which is specifically glass, polymethylmethacrylate (PMMA), polycarbonate, cycloolefin polymer, olefin, or the like. In addition, for easy demolding of the gasket from the mold after the formation of the gasket, it is preferable to apply a release agent such as a fluorine-based agent or a silicone-based agent. More specifically, this is a method for sealing at least part of at least two flanges of seal target components including the at least two flanges, the method characterized by including the steps of: placing a gasket formation mold on at least one of the flanges; injecting the foregoing curable resin composition into at least part of a cavity formed between the gasket formation mold and the flange on which the mold is placed, irradiating the curable resin composition with the active energy rays to cure the curable resin composition, thereby forming a gasket composed of a cured product of the curable resin composition; detaching the mold from the one flange; and placing the other flange on the gasket and sealing the at least part of between the at least two flanges by pressure bonding the one flange and the other flange together with the gasket interposed in between.

The liquid injection molding is a method involving: forming a gasket by injecting the curable resin composition of the present invention with a predetermined pressure into a mold made of an active energy ray-transmissive material, and (photo)curing the curable resin composition by irradiation with active energy rays such as ultraviolet rays; and performing compression sealing with the flange stuck on the other flange. Here, the mold is preferably made of an active energy ray-transmissive material, which is specifically glass, PMMA, polycarbonate, cycloolefin polymer, olefin, or the like. In addition, for easy demolding of the gasket from the mold after the formation of the gasket, it is preferable to apply a release agent such as a fluorine-based agent, a silicone-based agent, or the like.

EXAMPLES

Hereinafter, the present invention will be described in further details by taking Examples, but the present invention should not be limited to these Examples.

<Preparation of Curable Resin Composition>

Example 1

Added were 77 parts by mass of polyisobutylene (EPION 400A, manufactured by Kaneka Corporation) having alkenyl groups at both ends and having 1700 Pa·s at 25° C. (a1) as the ingredient (A) of the present invention, 7 parts by mass (equivalent to 1.2 equivalent ratio (hydrosilyl groups/alkenyl groups of the ingredient (A))) of a hydrosilyl group-containing compound (CR-300, manufactured by Kaneka Corporation) as the ingredient (B), 65 µl ($1 \times 10^{-3}$ mol relative to 1 mol of alkenyl groups in the ingredient (A)) of an isopropyl alcohol solution of platinum-divinyltetramethyldisiloxane complex (Pt-VTS-3.0 IPA, manufactured by Umicore Precious Metals Japan) as the ingredient (C), 23 parts by mass of poly-α-olefin-based plasticizer (SPECTORASYN 6, manufactured by ExxonMobil) having a number average molecular weight of 807, a polydispersity of 1.037, and two peaks in the weight distribution measured by GPC (the high molecular weight side peak top molecular weight is 862 and the low molecular weight side peak top molecular weight is 723, see the molecular weight distribution of FIG. 3) (d1) as the ingredient (D), 20 parts by mass of spherical silica having an average particle diameter of 2.9 µm as the filler, and 0.015 parts by mass of dimethyl maleate as the reaction rate regulator, followed by mixing for 60 minutes with a planetary mixer at room temperature (25° C.) to obtain Example 1 being a curable resin composition.

Example 2

Example 2 was obtained by the same preparation as in Example 1 except that 23 parts by mass of the ingredient (d1) in Example 1 was changed to 34 parts by mass.

Example 3

Example 3 was obtained by the same preparation as in Example 1 except that 23 parts by mass of the ingredient (d1) in Example 1 was changed to 46 parts by mass.

Comparative Example 1

Comparative Example 1 was obtained in the same preparation as in Example 1 except that the ingredient (d1) in Example 1 was changed to a poly-α-olefin-based plasticizer (SPECTORASYN 10, manufactured by ExxonMobil) having a number average molecular weight of 1100, a polydispersity of 1.079, and one peak in the molecular weight distribution measured by GPC (the peak top molecular weight is 1124, see the molecular weight distribution of FIG. 3) (d'1).

Comparative Example 2

Comparative Example 2 was obtained in the same preparation as in Example 1 except that the ingredient (d1) in Example 1 was changed to a poly-α-olefin-based plasticizer (SPECTORASYN 4, manufactured by ExxonMobil) having a number average molecular weight of 660, a polydispersity of 1.028, and one peak in the molecular weight distribution measured by GPC (the peak top molecular weight is 627, see the molecular weight distribution of FIG. 3) (d'2).

The test methods carried out in Examples and Comparative Examples of Table 1 are as follows.

<Measurement of Viscosity>

The viscosity (Pa·s) of the curable resin composition was measured with a cone plate type viscometer (manufactured by Brookfield) under the following measurement conditions. The results are shown in Table 1. Note that in the present invention, the viscosity is preferably 500 Pa·s or less from the viewpoint of screen printability.

Measurement Conditions:
Cone type CPE-52
Rotational speed 0.5 rpm
Shear rate 1.0 l/s
Temperature 25° C.

<Measurement of Hardness of Cured Product>

The thickness of the curable resin composition was set to 2 mm, followed by heat curing by heating at 130° C. for 1 hour to prepare a sheet-shaped cured product. The pressing surface of an A-type durometer (hardness meter) and the sample were brought into close contact while keeping the pressing surface parallel to the test piece (a stack of three sheet-shaped cured products having a thickness set to 6 mm) with a force of 10 N. The maximum value was read at the time of measurement, and the maximum value was referred to as the "hardness" (Shore A hardness). The details were in accordance with JIS K 6253. Note that when the curable resin composition of the present invention is used as a sealing agent for fuel cells, preferable hardness (Shore A hardness) is 20 or more and less than 80 because excellent sealability can be obtained.

<Measurement of Tensile Strength of Cured Product>

The thickness of the curable resin composition was set to 2 mm, followed by heat curing by heating at 130° C. for 1 hour to prepare a sheet-shaped cured product. A No. 3 dumbbell was used for punchout to make a test piece. Both ends of the test piece were fixed to the chucks so that the long axis of the test piece and the centers of the chucks were aligned in a straight line. The test piece was pulled at a pulling rate of 500 mm/min, and the maximum load until the test piece was cut was measured. The strength at the time of the maximum load was referred to as the "tensile strength (MPa)." The details were in accordance with JIS K 6251. The results are shown in Table 1. Note that when the curable resin composition of the present invention is used as a sealing agent for fuel cells, preferable tensile strength is 1.5 MPa or more because excellent sealability can be obtained.

<Measurement of Elongation of Cured Product>

The thickness of the curable resin composition was set to 2 mm, followed by heating at 130° C. for 1 hour for heat-curing to prepare a sheet-shaped cured product. Punchout was done with a No. 3 dumbbell to prepare a test piece, followed by drawing of mark lines in the test piece with a spacing of 20 mm.

The test piece was fixed to the chuck in the same manner as the measurement of the tensile strength and was pulled at a pulling rate of 500 mm/min until the test piece was cut. Since the test piece extended while being measured and the distance between the mark lines was widened, measurement was carried out on the interval between the marks with a caliper until the test piece was cut. Based on the initial mark line interval, the rate of elongation was defined as "elongation rate (%)." The results are shown in Table 1. Note that when the curable resin composition of the present invention is used as a sealing agent for fuel cells, preferable elongation is 240% or more because excellent sealability can be obtained.

TABLE 1

| | | Example 1 | Example 2 | Example 3 | Comparative Example 1 | Comparative Example 2 |
|---|---|---|---|---|---|---|
| Ingredient (A) | EPION 400A | 77 | 77 | 77 | 77 | 77 |
| Ingredient (B) | CR-300 | 7 | 7 | 7 | 7 | 7 |
| Ingredient (C) | Platinum-Divinyltetramethyldisiloxane Complex | 65 μl | 65 μl | 65 μl | 65 μl | 65 μl |
| Ingredient (D) | SPECTORASYN 6 (d1) | 23 | 34 | 46 | | |
| Reference Example of Ingredient (D) | SPECTORASYN 10 (d'1) | | | | 23 | |
| | SPECTORASYN 4 (d'2) | | | | | 23 |
| Optional Ingredient | Spherical Silica | 20 | 20 | 20 | 20 | 20 |
| | Dimethyl Maleate | 0.015 | 0.015 | 0.015 | 0.015 | 0.015 |
| | Viscosity (Pa · s) | 456 | 217 | 88 | 679 | 385 |
| | Hardness (Shore A Hardness) | 30 | 27 | 26 | 29 | 18 |
| | Tensile Strength (MPa) | 2.0 | 1.8 | 1.8 | 2.0 | 1.4 |
| | Elongation Rate (%) | 250 | 306 | 309 | 230 | 325 |

(NOTE)
The amounts of the ingredients are in part by mass unless otherwise noted.

According to Examples 1 to 3 in Table 1, it was found that the present invention had a rubber physical property while having a low viscosity. In addition, Comparative Example 1 used (d'1) instead of the ingredient (D) of the present invention, and the results were such that the viscosity was higher and the elongation was lower than those of Example 1. Moreover, Comparative Example 2 used (d'2) instead of the ingredient (D) of the present invention, and the results were such that the hardness was lower and the tensile strength was worse than those of Example 1.

Next, a test for confirming the hydrogen gas barrier property of the cured product of the curable resin composition of the present invention was conducted.

<Hydrogen Gas Barrier Property Test>

The thickness of the curable resin composition of Example 1 or 3 was set to 2 mm, followed by heating at 130° C. for 1 hour for heat-curing to prepare a sheet-shaped cured product. The cured product was used for measurement in accordance with JIS K 7126-1; 2006 (plastic-film and sheet-gas permeability test method—Part 1: differential pressure method). Note that the type of the test was a pressure sensor method under the condition of 23° C. Measurement was performed using a sheet of 1 mm thick with the test gas (hydrogen gas) on the high pressure side under 100 kPa. Note that when the curable resin composition of the present invention is used as a sealing agent for fuel cells, the preferable value of the hydrogen gas barrier property is less than $1\times10^{-14}$ mol·m/m²·s·Pa because excellent sealability can be obtained. The results were such that Example 1 had $7\times10^{-15}$ mol·m/m²·s·Pa and Example 3 had $3\times10^{-15}$ mol·m/m²·s·Pa.

INDUSTRIAL APPLICABILITY

The curable resin composition of the present invention has low viscosity as well as properties such as rubber physical property and hydrogen gas barrier property, and thus can be applied to various usages such as a sealing agent, an adhesive, a coating agent, an injecting agent, a potting agent, and the like. Therefore, the curable resin composition of the present invention is industrially useful.

REFERENCE SIGNS LIST 1 cell of solid polymer fuel cells
2 separator
3a fuel electrode (anode)
3b air electrode (cathode)
4 polymer electrolyte membrane
5 electrolyte membrane electrode assembly (MEA)
6 frame
7 adhesive or sealing agent
8a fuel gas flow path
8b oxidation gas flow path
9 cooling water flow path
10 cell stack
11 solid polymer fuel cell

What is claimed is:

1. A curable resin composition comprising the following ingredients (A) to (D):
    ingredient (A): a vinyl-based polymer having one or more alkenyl groups in one molecule,
    ingredient (B): a compound having one or more hydrosilyl groups in one molecule,
    ingredient (C): a hydrosilylation catalyst, and
    ingredient (D): a plasticizer having at least two peak top molecular weights in a molecular weight distribution measured by GPC, wherein said at least two peak top molecular weights are in a range of 300 to 5000.

2. The curable resin composition according to claim 1, wherein
    the ingredient (D) is a poly-α-olefin-based plasticizer.

3. The curable resin composition according to claim 1, wherein
    the ingredient (D) has a number average molecular weight of 300 to 5000.

4. The curable resin composition according to claim 1, wherein
    the vinyl-based polymer of the ingredient (A) is polyisobutylene having one or more alkenyl groups.

5. A sealing agent for a fuel cell comprising the curable resin composition according to claim 1.

6. The sealing agent for a fuel cell according to claim 5, wherein
    the sealing agent for the fuel cell is a sealing agent for a periphery of any member selected from the group consisting of separators, frames, electrolytes, fuel electrodes, air electrodes, and electrolyte membrane electrode assemblies, which are members in a fuel cell.

7. The sealing agent for a fuel cell according to claim 5, wherein
    the sealing agent for the fuel cell is a sealing agent between adjacent separators in the fuel cell or a sealing agent between a frame and an electrolyte membrane or an electrolyte membrane electrode assembly in the fuel cell.

8. The sealing agent for a fuel cell according to claim 5, wherein
    the fuel cell is a solid polymer fuel cell.

9. A cured product which is cured by heating or irradiating the curable resin composition according to claim 1 with an active energy ray.

10. A fuel cell comprising any seal selected from the group consisting of seals between adjacent separators in the fuel cell and seals between a frame and an electrolyte membrane or an electrolyte membrane electrode assembly in the fuel cell, wherein
    the any seal contains the cured product according to claim 9.

11. The fuel cell according to claim 10, wherein
    the fuel cell is a solid polymer fuel cell.

12. A method for sealing at least part of at least two flanges of seal target components including the at least two flanges, at least one of which is a light-transmissive flange allowing active energy rays to pass therethrough, the method comprising the steps of:
    applying the curable resin composition according to claim 1 to a surface of at least one of the flanges;
    sticking the one flange with the curable resin composition applied thereto onto the other flange with the curable resin composition interposed in between; and
    sealing the at least part of the at least two flanges by curing the curable resin composition by irradiation with active energy rays through the light-transmissive flange.

13. A method for sealing at least part of at least two flanges of seal target components including the at least two flanges, comprising the steps of:
    applying the curable resin composition according to claim 1 to at least one of the flanges;
    irradiating the applied curable resin composition with active energy rays to cure the curable resin composition, thereby forming a gasket composed of a cured product of the curable resin composition;
    placing the other flange on the gasket, and sealing the at least part of the at least two flanges in such a way that the other flange and the one flange with the curable resin composition applied thereto are pressure bonded together with the gasket interposed in between.

14. A method for sealing at least part of at least two flanges of seal target components including the at least two flanges, comprising the steps of:
    placing a gasket formation mold on at least one of the flanges;
    injecting the curable resin composition according to claim 1 into at least part of a cavity formed between the gasket formation mold and the flange on which the mold is placed;

irradiating the curable resin composition with the active energy rays to cure the curable resin composition, thereby forming a gasket composed of a cured product of the curable resin composition;

detaching the mold from the one flange; and sealing the at least part of the at least two flanges by placing the other flange on the gasket and then pressure bonding the one and the other flanges together with the gasket interposed in between.

15. The curable resin composition according to claim 1, wherein the ingredient (B) is organohydrogen polysiloxanes.

16. The curable resin composition according to claim 1, wherein an equivalent ratio of [the hydrosilyl groups contained in the ingredient (B)]/[the alkenyl groups contained in the ingredient (A)] is 0.5 to 2.0.

17. The curable resin composition according to claim 1, wherein the ingredient (D) is a poly-α-olefin-based plasticizer with at least two peak top molecular weights being in a range of 700 to 3000.

18. The curable resin composition according to claim 1, further comprising a compound containing an aliphatic unsaturated bond as a reaction rate regulator.

19. The curable resin composition according to claim 1, wherein polydispersity of the entire molecular weight distribution of the ingredient (D), which is represented by [weight average molecular weight/number average molecular weight], is in a range of 1.02 to 1.10.

20. The curable resin composition according to claim 1, wherein the at least two peak top molecular weights of the ingredient (D) are in a range of 500 to 4000.

* * * * *